(12) United States Patent
Stegmeier

(10) Patent No.: US 6,568,859 B1
(45) Date of Patent: May 27, 2003

(54) BEARING SUPPORT

(76) Inventor: Bill Stegmeier, 27116 Grummand Ave., Tea, SD (US) 57064

( * ) Notice: Subject to any disclaimer, the term of this patent is extended or adjusted under 35 U.S.C. 154(b) by 0 days.

(21) Appl. No.: 09/785,159

(22) Filed: Feb. 16, 2001

(51) Int. Cl.7 .............................................. F16C 43/04
(52) U.S. Cl. ....................... 384/559; 384/510; 384/585; 29/898.01; 29/898.07; 29/898.08
(58) Field of Search ................... 384/510, 584, 384/585, 559, 537, 541, 542; 29/898.01, 898.07, 898.08

(56) References Cited

U.S. PATENT DOCUMENTS

| | | | |
|---|---|---|---|
| 1,176,749 A | | 3/1916 | Gere |
| 1,323,281 A | | 12/1919 | Holy |
| 2,509,775 A | * | 5/1950 | Libert ........................ 384/510 |
| 3,446,541 A | | 5/1969 | Nakano |
| 3,655,226 A | | 4/1972 | Cowan |
| 3,689,126 A | * | 9/1972 | Hayashi et al. ............. 384/559 |
| 3,748,002 A | | 7/1973 | Barker et al. |
| 3,826,138 A | | 7/1974 | Rittenhouse |
| 3,994,541 A | * | 11/1976 | Geary et al. ................ 384/117 |
| 4,133,587 A | | 1/1979 | Kume |
| 4,240,677 A | | 12/1980 | Payne et al. |
| 4,438,991 A | | 3/1984 | Lundgren |
| 4,605,316 A | * | 8/1986 | Utecht ......................... 384/99 |
| 4,772,139 A | | 9/1988 | Bretton |
| 5,082,299 A | | 1/1992 | Beattie |
| 5,373,636 A | * | 12/1994 | Martinie .................. 29/898.08 |
| 5,531,523 A | | 7/1996 | Subbiah |

* cited by examiner

*Primary Examiner*—Matthew C. Graham
*Assistant Examiner*—Mariano Sy
(74) *Attorney, Agent, or Firm*—Kaardal & Leonard, LLP

(57) ABSTRACT

A bearing support for facilitating removal and replacement of a bearing and supporting the rotatable shaft while the bearing is removed from the shaft. The bearing support includes a bearing support including a bearing mounting structure for being supported on the machine. A bearing assembly is provided for receiving a portion of the shaft. A bearing housing assembly is positioned between the bearing assembly and the bearing mounting structure. The bearing assembly is supported on the bearing housing assembly and the bearing housing assembly is supported on the bearing mounting structure. The bearing housing assembly is removable from the bearing mounting structure prior to removal of the bearing assembly from the shaft for facilitating removal of the bearing assembly from the shaft. Another aspect of the invention includes a shaft support system for facilitating removal and replacement of a bearing assembly adapted for supporting a shaft on a machine. A shaft support assembly is mounted on the bearing mounting structure, and the shaft support assembly selectively supports the shaft on the bearing mounting structure independent of the bearing assembly for facilitating removal and replacement of the bearing assembly.

9 Claims, 4 Drawing Sheets

BEARING SUPPORT

BACKGROUND OF THE INVENTION

1. Field of the Invention

The present invention relates to rotating shaft bearing mounting structures and more particularly pertains to a new bearing support for facilitating removal and replacement of a bearing and supporting the rotatable shaft while the bearing is removed from the shaft.

2. Description of the Prior Art

The use of rotating shaft bearing mounting structures in machines is known in the prior art. The bearings in the rotating shaft bearing mounting structures must periodically serviced, and the servicing typically includes removal and replacement of the bearings. On larger machines, the bearing removal and replacement is made more difficult by the fact that the removal and replacement must be performed at the site where the machine is installed. Known rotating shaft bearing mounting structures, especially those on larger machines, typically position the bearings in a cavity or channel that extends into the machine and, as a result, restricts access to the bearing. This restrictive positioning of the bearing in the machine makes the periodic servicing of the bearings more difficult. Making the bearing removal process even more difficult is the fact that the bearings are typically mounted in the cavity with very close tolerances which hampers the ability of service persons to get a grasp on the bearings, and resists sliding removal of the bearing from the cavity.

When the shaft supported by the bearing has considerable mass, such as in the case of grinding machinery where a roller is mounted on the shaft, the removal and replacement of bearings is further hindered. Typically, a hoist must be brought to the site of the machine to lift the end of the shaft such that the weight of the shaft and roller may be removed from the bearing so that the bearing may be removed and replaced.

The bearing support according to the present invention substantially departs from the conventional concepts and designs of the prior art, and in so doing provides an apparatus primarily developed for the purpose of facilitating removal and replacement of a bearing and supporting the rotatable shaft while the bearing is removed from the shaft.

SUMMARY OF THE INVENTION

In view of the foregoing disadvantages inherent in the known types of rotating shaft bearing mounting structures now present in the prior art, the present invention provides a new bearing support construction wherein the same can be utilized for facilitating removal and replacement of a bearing and supporting the rotatable shaft while the bearing is removed from the shaft.

To attain this, the present invention generally comprises a bearing support including a bearing mounting structure for being supported on the machine. A bearing assembly is provided for receiving a portion of the shaft. A bearing housing assembly is positioned between the bearing assembly and the bearing mounting structure. The bearing assembly is supported on the bearing housing assembly and the bearing housing assembly is supported on the bearing mounting structure. The bearing housing assembly is removable from the bearing mounting structure prior to removal of the bearing assembly from the shaft for facilitating removal of the bearing assembly from the shaft. Another aspect of the invention includes a shaft support system for facilitating removal and replacement of a bearing assembly adapted for supporting a shaft on a machine. A shaft support assembly is mounted on the bearing mounting structure, and the shaft support assembly selectively supports the shaft on the bearing mounting structure independent of the bearing assembly for facilitating removal and replacement of the bearing assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects and various features of novelty which characterize the invention are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
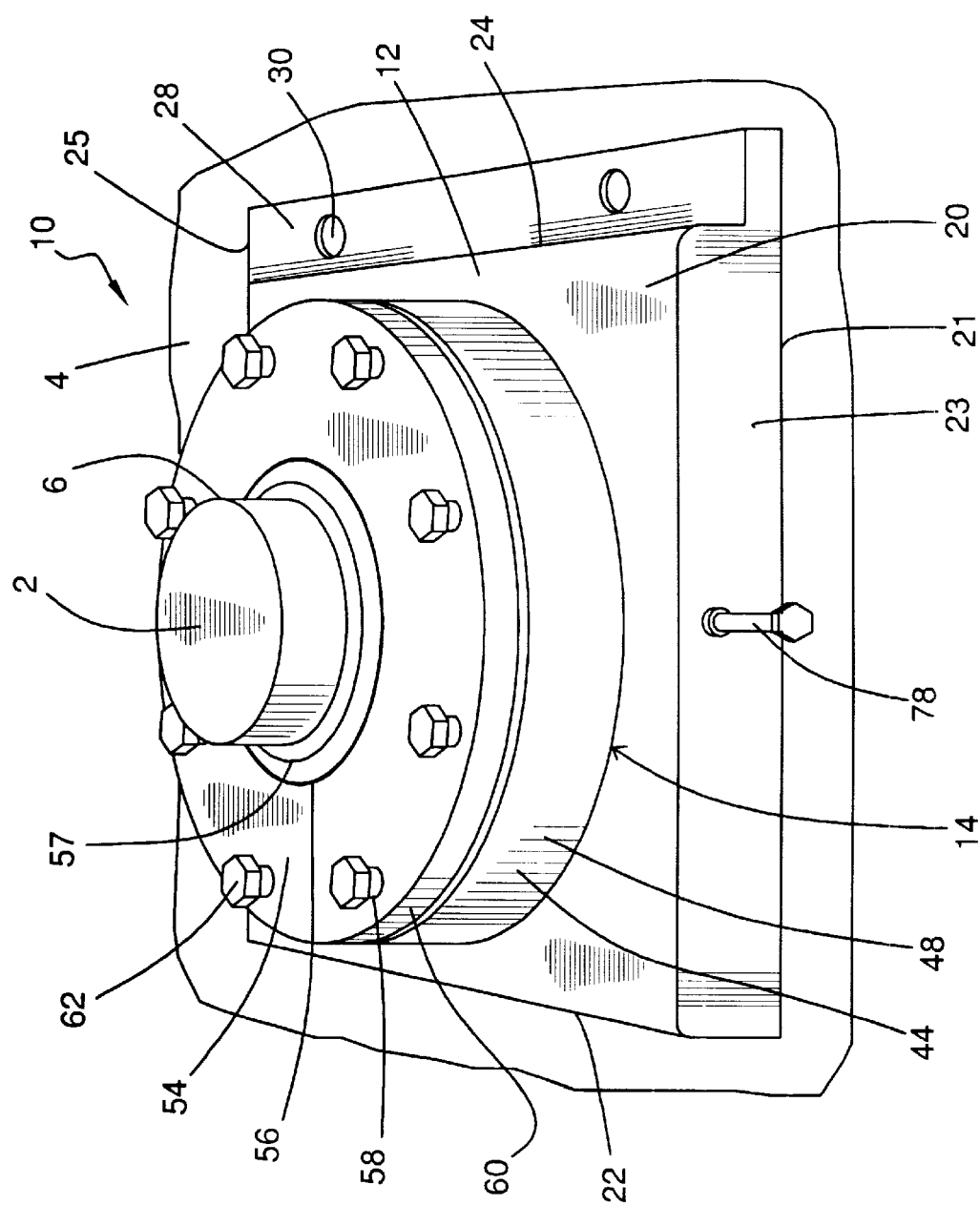
FIG. 1 is a schematic perspective view of a new bearing support according to the present invention.
Figure 2:
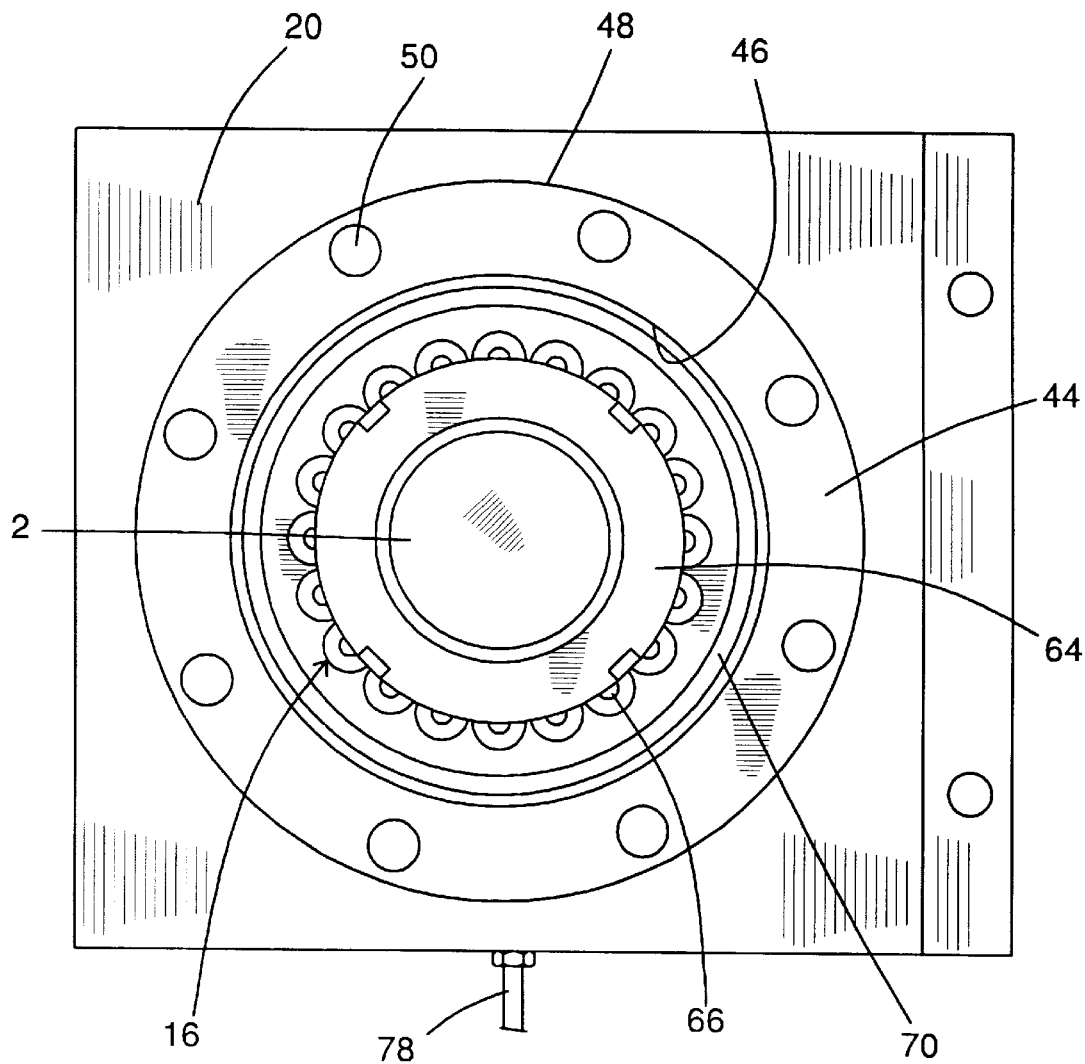
FIG. 2 is a schematic plan view of the bearing support of the present invention with the annular cap removed from the bearing housing assembly to expose the bearing assembly.
Figure 3:
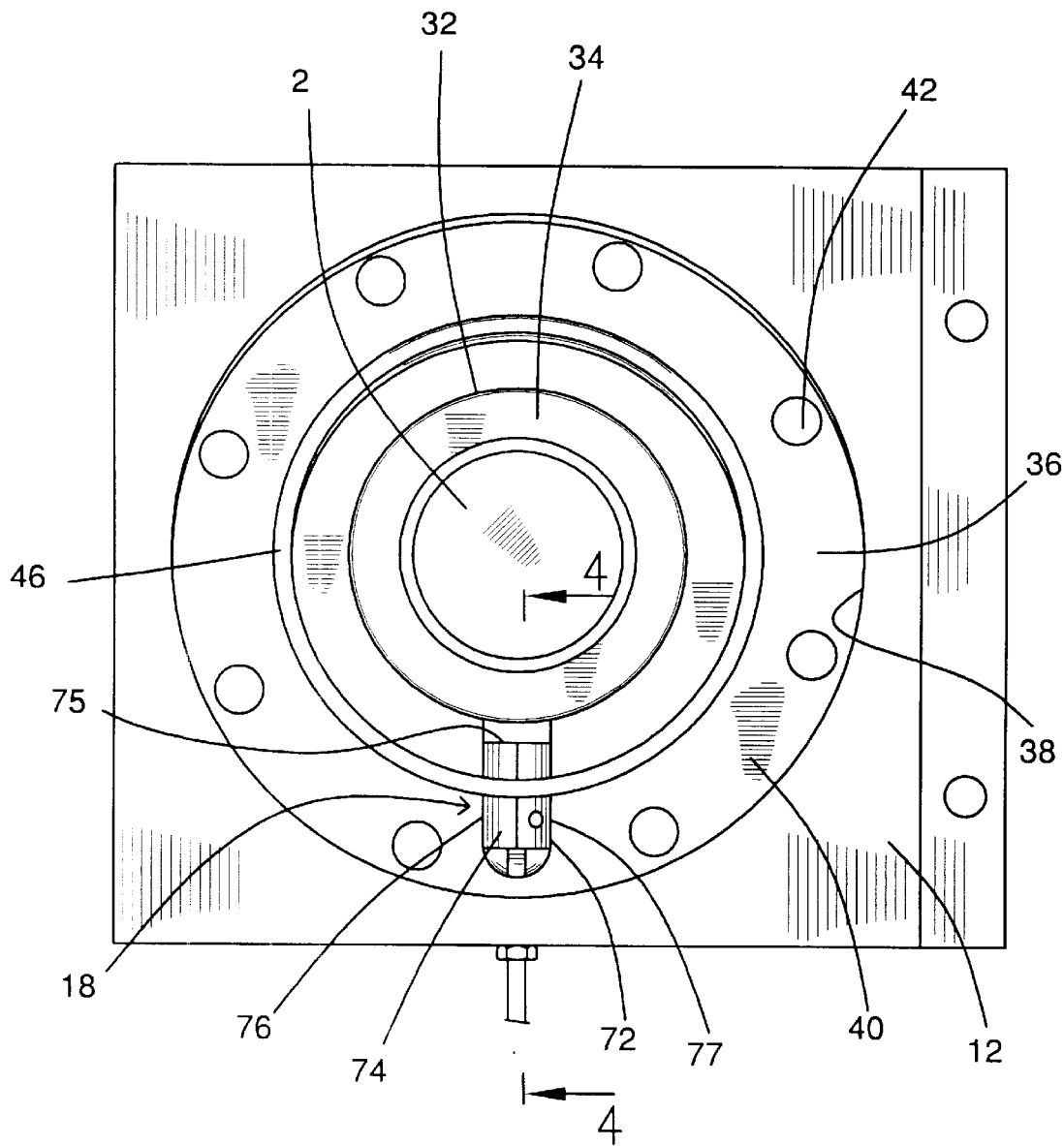
FIG. 3 is a schematic plan view of the bearing support of the present invention with the bearing housing assembly and the bearing assembly removed to expose the annular recess of the bearing mounting structure.
Figure 4:
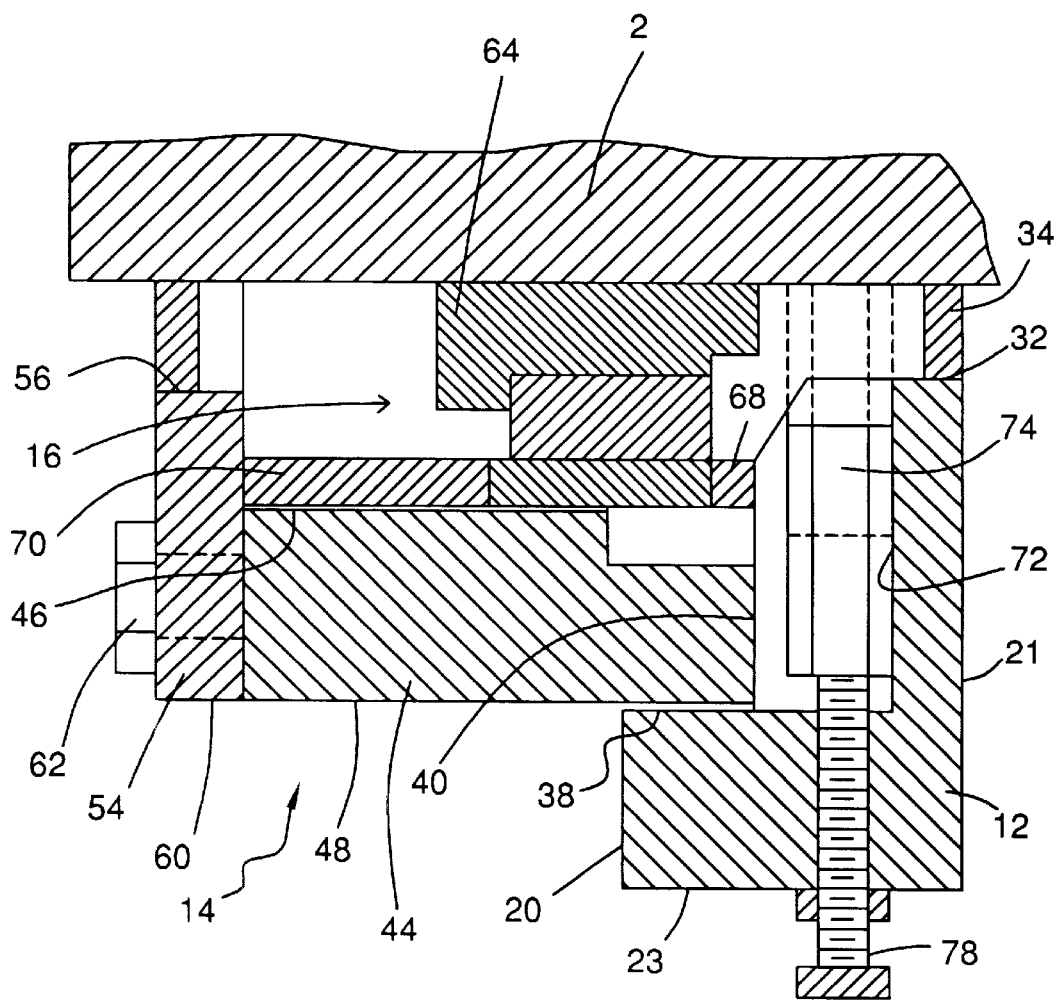
FIG. 4 is a schematic sectional view taken along line 4—4 of FIG. 3 and particularly showing the shaft support member in a retracted position (in solid lines) and an extended position (in broken lines).

With reference now to the drawings, and in particular to FIGS. 1 through 4 thereof, a new bearing support embodying the principles and concepts of the present invention and generally designated by the reference numeral 10 will be described.

As best illustrated in FIGS. 1 through 4, the bearing support 10 generally comprises a bearing mounting structure 12, a bearing housing assembly 14, a bearing assembly 16, and a shaft support assembly 18.

The bearing support 10 of the invention is highly suitable for supporting a substantially cylindrical shaft 2 on a machine 4, such as, for example, the shaft extending from an end of a roller in a grain grinding machine. For ease of description, an inward or inner direction is assumed to be toward the machine and toward the major portion of the shaft, and an outward or outer direction is assumed to be away from the machine and away from the major portion of the shaft, such as toward the end of the shaft.

The bearing support 10 of the invention includes a bearing mounting structure 12 for positioning on the machine 4 in a location suitable for supporting an end of the shaft 2, and preferably a bearing mounting structure is located on the machine at opposite ends of the shaft. One example of the bearing mounting structure 12, a bearing mounting block for mounting on a machine, is illustrated in the drawings and has a front 20 and a rear 21. In one illustrative embodiment of the invention, the front 20 and rear 21 of the bearing mounting block are oriented in a substantially parallel relationship to each other. Further, the bearing mounting block may illustratively have four sides 22, 23, 24, 25 that extend between the front and rear faces of the block. The size and shape of the block may vary according to the particular machine application. Further, the mounting block may form an integral part of the machine and may or may not be separable from the machine. Optionally, the bearing mounting block 12 may have a flange 28 that extends along and outwardly from one of the side faces of the bearing mounting block. A plurality of mounting holes 30 may be formed in the bearing mounting block for receiving fasteners for coupling the block to the machine. The plurality of mounting holes may be located in the flange 28.

A central aperture 32 is formed in the bearing mounting structure 12 for receiving a portion of the shaft 2 into the aperture. The central aperture 32 may extend through the bearing mounting block between the front 20 and rear 21 faces. The central aperture preferably is may be substantially circular, and is preferably slightly larger than the diameter of the shaft. A inner seal 34 may be positioned in the central aperture toward the rear face of the mounting structure. An annular recess 36 may be formed in the bearing mounting structure, and preferably the annular recess extends into the front face of the bearing mounting structure. The annular recess may be centered on and in communication with the central aperture of the bearing mounting structure. The annular recess may be formed by an inward surface 38 and a base surface 40 extending radially outward from the central aperture to the inward surface. In one illustrative embodiment described herein, the inward surface 38 is substantially cylindrical and the base surface 40 is substantially planar, and the base surface is oriented substantially perpendicular to the axis of the shaft.

A plurality of first bores 42 may be formed in the bearing mounting structure for accepting a plurality of fasteners. The first bores are preferably positioned in the base surface of the annular recess. Preferably, the plurality of first bores are substantially equally circumferentially spaced along the annular recess, and are internally threaded for threadedly engaging the fasteners.

One highly significant aspect of the invention is the bearing housing assembly 14 which facilitates removal and replacement of the bearing assembly 16 from the machine by permitting removal of the bearing housing from around the bearing assembly prior to the removal and replacement of the bearing assembly. Preferably the bearing housing 16 includes an outer sleeve 44 that is removably mountable on the bearing mounting structure 12. The outer sleeve 44 has an inner surface 46 and an outer surface 48. At least a portion of the outer sleeve is removably nested in the annular recess 36 such that the outer surface 48 of the outer sleeve 44 is positioned adjacent to the inward surface 38 of the annular recess 36. Preferably, the outer surface 48 is snugly abutted against the inward surface 38 for surrounding the outer sleeve on the mounting structure 12. A plurality of second bores 50 may be formed in the outer sleeve 44, and are preferably arranged so that the plurality of second bores are alignable with the plurality of first bores 42 in the bearing mounting structure. The interiors of the second bores may be substantially smooth without internal threading.

The bearing housing assembly may also include an annular cap 54 removably mounted on the outer sleeve. The annular cap has a central bore 56 for receiving the shaft. In the illustrative embodiment, the annular cap comprises a circular plate. An outer seal structure 57 may be positioned in the central bore 56 for forming a seal between the shaft 2 and the central bore of the annular cap. The annular cap may have a plurality of third bores 58 formed therein, and the third bores are positioned in the cap for alignment with the plurality of first 42 and second 50 bores. The plurality of third bores 58 may be positioned along a perimeter 60 of the annular cap. A plurality of fasteners 62 may be removably extended through the plurality of first, second, and third bores for securing the annular cap and the outer sleeve of the bearing housing assembly to the bearing mounting structure.

The bearing assembly 16 is removably positioned between the inner surface 46 of the outer sleeve 44 and an outer surface 6 of the shaft for facilitating rotation of the shaft with respect to the outer sleeve and the bearing mounting structure. The bearing assembly preferably comprises a bearing race 64 holding a plurality of bearings 66.

An inner spacer ring 68 may be provided for spacing the bearing assembly 16 from the base surface 40 of the annular recess. The inner spacer ring 68 is radially positionable inward of the inner surface 46 of the outer sleeve. The inner spacer ring is circular, with a diameter preferably greater than a diameter of the central aperture 32 and less than a diameter of the inward surface 38 of the annular recess. An outer spacer ring 70 may be provided for spacing the bearing assembly 16 from the inner face of the annular cap. The outer spacer ring is removably positioned in the outer sleeve, and has an inner surface and an outer surface.

Another significant aspect of the invention is the shaft support assembly 18 which permits selective supporting the shaft free and independent of the bearing assembly, so that the shaft may be supported during removal and replacement of the bearing assembly without requiring a temporary external support for the shaft, such as a hoist. The shaft support assembly includes a channel 72 formed in the bearing mounting structure 12. The channel 72 may extend radially outward from the central aperture 32, and may have an axis intersecting an axis extending through the central aperture. The channel may extend through one of the side faces of the bearing mounting block. The channel has two segments, with a first segment located adjacent the base surface of the annular recess, and a second segment extending radially outward from the first segment. In one illustrative embodiment, the first segment is open on one side to the base surface of the annular recess, the first segment is relatively wider than the second segment, and the second segment is internally threaded.

The shaft support assembly also includes a shaft support member 74. The shaft support member 74 has a free end 75 for selectively abutting against the shaft extending in the central aperture. The shaft support member 74 has an extended position and a retracted position. The shaft support member 74 is located in the channel 72 (e.g., in the first segment thereof) free of the shaft when the shaft support member is in the retracted position. The shaft support member 74 is extended at least partially into the central aperture in the extended position for abutting against and selectively supporting the shaft. The positioning of the channel 72 inwardly of the base surface 40 permits the shaft support member to contact and support the shaft at a location that is inward of the bearing assembly, so that the shaft support member does not interfere with the removal of the bearing assembly from the bearing housing. The shaft support member may be elongate, and preferably has at least one pair of opposite substantially flat sides 76, 77 which extend along a portion of the length of the shaft support member. The pair of opposite sides 76, 77 may be oriented in parallel planes. Significantly, the pair of opposite sides engage opposite surfaces of the channel 72 such that axial rotation of the shaft support member is prevented by the sides of the channel.

The shaft support assembly includes a positioning member 78 located in the channel of the bearing mounting structure, preferably in the second segment thereof. The shaft support member 74 is mounted on the positioning member 78, and the positioning member is axially movable in the channel 74. The positioning member 78 has a threaded exterior that engages the internally threaded portion of the channel such that rotation of the positioning member moves the shaft support member between the retracted and extended positions of the shaft support member and in a radial direction with respect to the central aperture. Preferably, an end of the positioning member is exposed for being actuated, and the exposed end has a structure that easily engaged for rotation, such as, for example, a hexagonal-shaped head that may be engaged by a wrench.

In use, when it is desired to remove or otherwise gain access to the bearing assembly, the shaft support member 74 is advanced into abutment with the shaft 2 by rotating the positioning member. Once the shaft is supported on the shaft support member, the fasteners 62 are removed and the annular cap 54 is removed from the housing assembly and the shaft. The outer sleeve 44 is removed from the annular recess 36. The outer spacer ring 70 (if employed) may be removed, and the bearing assembly 16 may then be removed from the shaft for servicing such as replacement. After servicing of the bearing assembly, the bearing assembly is replaced on the shaft and the bearing housing assembly reassembled, and the positioning member is rotated to move the shaft support member into the retracted position.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shaft support system for facilitating removal and replacement of a bearing assembly adapted for supporting a shaft on a machine, the shaft support system comprising:

a bearing mounting structure for supporting the bearing assembly; and a shaft support assembly mounted on the bearing mounting structure, the shaft support assembly selectively supporting the shaft on the bearing mounting structure independent of the bearing assembly for facilitating removal and replacement of the bearing assembly;

wherein the bearing mounting structure has a central aperture for receiving a portion of the shaft;

wherein the bearing mounting structure includes a channel formed in the bearing mounting structure, the channel extending radially outward from the central aperture;

wherein the shaft support assembly includes a shaft support member having a free end for selectively abutting against the shaft extending in the central aperture; and wherein the channel being in communication with the central aperture such that the shaft support member is abuttable against the shaft when the shaft is positioned in the central aperture without removal of the bearing mounting structure;

wherein the channel is axially displaced from the shaft support assembly such that the shaft support member is abuttable against the shaft when the shaft is positioned in the central aperture without removal of the bearing mounting structure.

2. A shaft support system for facilitating removal and replacement of a bearing assembly adapted for supporting a shaft on a machine, the shaft support system comprising:

a bearing mounting structure for supporting the bearing assembly; and a shaft support assembly mounted on the bearing mounting structure, the a shaft support assembly selectively supporting the shaft on the bearing mounting structure independent of the bearing assembly for facilitating removal and replacement of the bearing assembly;

wherein the bearing mounting structure has a central aperture for receiving a portion of the shaft;

wherein the bearing mounting structure includes a channel formed in the bearing mounting structure, the channel extending radially outward from the central aperture;

wherein the shaft support assembly includes a shaft support member having a free end for selectively abutting against the shaft extending in the central aperture; and wherein the channel being in communication with the central aperture such that the shaft support member is abuttable against the shaft when the shaft is positioned in the central aperture without removal of the bearing mounting structure;

wherein the shaft support member has an extended position and a retracted position, the shaft support member being located in the channel free of the shaft when the shaft support member is in the retracted position, and the shaft support member being extended into the central aperture in the extended position for abutting against the shaft extending in the central aperture.

3. A shaft support system for facilitating removal and replacement of a bearing assembly adapted for supporting a shaft on a machine, the shaft support system comprising:
   a bearing mounting structure for supporting the bearing assembly; and
   a shaft support assembly mounted on the bearing mounting structure, the shaft support assembly selectively supporting the shaft on the bearing mounting structure independent of the bearing assembly for facilitating removal and replacement of the bearing assembly;
   wherein the bearing mounting structure has a central aperture for receiving a portion of the shaft;
   wherein the bearing mounting structure includes a channel formed in the bearing mounting structure, the channel extending radially outward from the central aperture;
   wherein the shaft support assembly includes a shaft support member having a free end for selectively abutting against the shaft extending in the central aperture; and
      wherein the channel being in communication with the central aperture such that the shaft support member is abuttable against the shaft when the shaft is positioned in the central aperture without removal of the bearing mounting structure;
      wherein the shaft support member has at least one pair of opposite substantially flat sides, the pair of opposite sides being oriented in substantially parallel planes for engaging opposites surfaces of the channel such that axial rotation of the shaft support member is prevented.

4. A bearing support for supporting a shaft on a machine, the bearing support comprising:
   a bearing mounting block for mounting on the machine, the bearing mounting block having a front and a rear, the bearing mounting block comprising:
      the bearing mounting block having a central aperture for receiving a portion of the shaft, the central aperture extending through the bearing mounting block between the front and rear;
      an annular recess formed in the bearing mounting block, the annular recess being located in the front face of the bearing mounting block, the annular recess being centered on and in communication with the central aperture of the bearing mounting block, the annular recess being formed by an inward surface and a base surface extending radially inward from the inward surface to the central aperture, the inward surface being substantially cylindrical and the base surface being substantially planar;
      a plurality of first bores in the bearing mounting block and being positioned in the annular recess, the plurality of first bores being substantially equally circumferentially spaced along the annular recess, the first bores being located in the base surface;
      a channel formed in the bearing mounting block, the channel extending radially outward from the central aperture, a portion of the channel being internally threaded, the channel having an axis intersecting an axis of the central aperture;
   a bearing housing assembly comprising:
      an outer sleeve removably mountable on the bearing mounting block, the outer sleeve having an inner surface and an outer surface, at least a portion of the outer sleeve being removably nested in the annular recess such that the outer surface of the outer sleeve is positioned adjacent the inward surface of the annular recess, a plurality of second bores being formed in the outer sleeve, the plurality of second bores being alignable with the plurality of first bores in the bearing mounting block;
      an annular cap removably mounted on the outer sleeve, the annular cap having a central bore for receiving the shaft, the annular cap having a plurality of third bores alignable with the plurality of first and second bores, the plurality of third bores being positioned along a perimeter of the annular cap;
      a plurality of fasteners extending through the plurality of first, second, and third bores for securing the annular cap and the outer sleeve to the bearing mounting block;
   a bearing assembly removably positioned between the inner surface of the outer sleeve and an outer surface of the shaft for facilitating rotation of the shaft with respect to the outer sleeve, the bearing assembly comprising a bearing race holding a plurality of bearings;
   a shaft support assembly for selectively supporting the shaft independently and free of the bearing assembly, the shaft support assembly comprising:
      a shaft support member, the shaft support member having a free end for selectively abutting against the shaft extending in the central aperture, the shaft support member having an extended position and a retracted position, the shaft support member being located in the channel free of the shaft when the shaft support member is in the retracted position, the shaft support member being extended into the central aperture in the extended position for abutting against the shaft extending in the central aperture, the shaft support member being elongate with at least one pair of opposite substantially flat sides extending along a portion of the length of the shaft support member, the pair of opposite sides being oriented in substantially parallel planes, the pair of opposite sides engaging opposites surfaces of the channel such that axial rotation of the shaft support member is prevented; and
      a positioning member positioned in the channel, the shaft support member being mounted on the positioning member, the positioning member being axially movable in the channel, the positioning member having a threaded exterior engaging the internally threaded portion of the channel such that rotation of the positioning member moves the shaft support member in an axial direction between the retracted and extended positions of the shaft support member.

5. A shaft support system for facilitating removal and replacement of a bearing assembly adapted for supporting a shaft on a machine, the shaft support system comprising:
   a bearing mounting structure for supporting the bearing assembly; and
   a shaft support assembly mounted on the bearing mounting structure, the shaft support assembly selectively supporting the shaft on the bearing mounting structure independent of the bearing assembly for facilitating removal and replacement of the bearing assembly;
   wherein the shaft support assembly includes a shaft support member having an extended position and a retracted position, the shaft support having a free end, the free end of the shaft support member abutting against the shaft when the shaft support member is in the extended position for raising the shaft with respect to the bearing mounting structure, the free end of the shaft support member being free of the shaft when the shaft support member is in the retracted position.

6. The shaft support system of claim 5 wherein the bearing mounting structure has a central aperture for receiving a portion of the shaft, the bearing mounting structure including a channel formed in the bearing mounting structure, the channel extending radially outward from the central aperture, the shaft support member being mounted in the channel.

7. A shaft support system for facilitating removal and replacement of a bearing assembly adapted for supporting a shaft on a machine, the shaft support system comprising:

a bearing mounting structure for supporting the bearing assembly; and a shaft support assembly mounted on the bearing mounting structure, the shaft support assembly selectively supporting the shaft on the bearing mounting structure independent of the bearing assembly for facilitating removal and replacement of the bearing assembly;

wherein the bearing mounting structure has a central aperture for receiving a portion of the shaft, the bearing mounting structure includes a channel formed in the bearing mounting structure, the channel extending radially outward from the central aperture;

wherein the shaft support assembly includes a shaft support member, the shaft support member having a free end for selectively abutting against the shaft extending in the central aperture;

a positioning member positioned in the channel, the shaft support member being mounted on the positioning member, the positioning member being axially movable in the channel.

8. The shaft support system of claim 7 wherein a portion of the channel is internally threaded.

9. The shaft support system of claim 8 wherein the positioning member has a threaded exterior engaging the internally threaded portion of the channel such that rotation of the positioning member moves the shaft support member in an axial direction between the retracted and extended positions of the shaft support member.

* * * * *